Patented July 4, 1950

2,513,698

UNITED STATES PATENT OFFICE 2,513,698

2(3)BENZOFURANONE DERIVATIVES AND METHODS OF MAKING THEM

Arthur W. Weston and Marvin A. Spielman, Waukegan, Ill., assignors to Abbott Laboratories, Chicago, Ill., a corporation of Illinois No Drawing. Application March 9, 1945, Serial No. 581,952

11 Claims. (Cl. 260—344.6)

This invention relates generally to therapeutic substances and more specifically to derivatives of furanone which are useful as antispasmodics (substances which have a relaxing effect on smooth muscle).

The invention may be illustrated by the following examples:

Example 1A

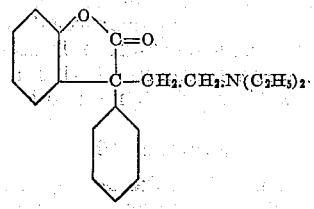

34.5 g. (g.=grams) of sodium metal are powdered under 300 cc. (cc.=cubic centimeters) of toluene by heating the sodium and toluene in a flask equipped with agitator and reflux condenser to a temperature sufficient to melt the sodium, agitating vigorously with cooling until the sodium particles solidify, and then diluting with 2 liters of benzene. To this suspension is added, portionwise, 315 g. of 3-phenyl-2(3)-benzofuranone accompanied by stirring. Refluxing is finally necessary to dissolve all the sodium. After cooling the resulting solution in an ice bath, 227 g. of β-diethylaminoethyl chloride is slowly added. The mixture is then stirred at room temperature for 60 hours.

The reaction product is extracted with dilute hydrochloric acid. The hydrochloride of the product may separate as a thick oil in a concentrated solution. The combined extracts are treated with excess sodium carbonate and the liberated base extracted in turn with ether. By concentrating the ether extracts and distilling the residue, there is obtained 402 g. of 3-(β-diethylaminoethyl)-3-phenyl-2(3)-benzofuranone, B. P. 195° C. (C.=centigrade) at 3 mm. pressure, in an 85% yield. The refractive index for the sodium line at 25° C. is 1.5612, customarily written $n_D^{25}=1.5612$.

Example 1B

The addition of gaseous hydrogen chloride to a solution of the above base in a solvent such as diethyl ether precipitates a gummy mass which slowly solidifies. By crystallization from an acetone-ether solution, the crystalline hydrochloride, M. P. 151–152° C. is obtained.

Example 1C

The addition of an excess of sulfuric acid to an ethereal solution of the base prepared in Example 1A produces the amine hydrogen sulfate (which might also be called a bisulfate) which after crystallization from absolute alcohol melts at 135–137° C.

Example 1D

The methobromide, prepared by allowing the base mentioned in Example 1A to stand at room temperature with excess alcoholic methyl bromide, melts after crystallization from ethyl methyl ketone at 127–129° C.

Example 1E

In a manner analogous to that disclosed in Example 1A, there is obtained by employing β-dimethylaminoethyl chloride, the base 3-(β-dimethylaminoethyl) - 3 - phenyl-2(3)-benzofuranone, B. P. 165–166° C. at 2 mm., $n_D^{25}$ 1.5700. The hydrochloride salt melts at 209–210° C.

Example 1F

Similarly, by employing γ-diethylaminopropyl chloride, the base 3-(γ-diethylaminopropyl)-3-phenyl-2(3)-benzofuranone, B. P. 187–189° at 2 mm., $n_D^{24}$, 1.5510 is obtained. The hydrochloride salts melts at 170–171° C.

Example 1G

In a similar manner, except that the reactants are refluxed in a toluene solution, there are obtained:

(1) By employing, β-di-n-butylamino ethyl chloride, the base 3-(β-di-n-butylamino ethyl)-3-phenyl-2(3)-benzofuranone, B. P. 210–212° at 2 mm., $n_D^{28}$, 1.5383, in a 74% yield. The hydrochloride salt melts at 120–121°.

(2) By employing, γ-di-n-butylamino propyl chloride, the base 3-(γ-di-n-butylamino propyl)-3-phenyl-2(3)-benzofuranone, B. P. 209–210° at 1 mm., $n_D^{29}$, 1.5278. The hydrochloride salts melts at 136–137°.

Example 2A

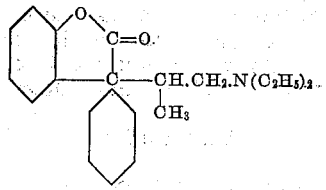

5 g. of 50% sodium hydride in paraffin is added with stirring to 25 cc. of dry toluene. After dilution of the sodium hydride suspension with 100 cc. of absolute ether, 21 g. of 3-phenyl-2(3)-benzofuranone is added portionwise. Stirring is continued until solution is complete. The addition of 15.0 g. of β-diethylaminoisopropyl chloride is followed by 19 hours of refluxing and stirring. The isolation of the new base is carried out as in Example 1A. The 3-(α-methyl-β-diethylaminoethyl)-3-phenyl-2(3)-benzofuranone has B. P. 174–175° C. at 2 mm., $n_D^{25}$ 1.5581, and is obtained in an 80% yield.

Example 2B

The hydrochloride prepared by treating the base produced in Example 2A with ethereal hydrogen chloride consists of a mixture of the two possible racemic forms and melts at 195–205° C. By fractional crystallization from an acetone-ether solvent the higher melting diastereoisomer, M. P. 222–224° C. is isolated.

Example 2C

In an analogous manner there is obtained by employing β-diethylaminopropyl chloride, the base 3-(β-diethylaminopropyl)-3-phenyl-2(3)-benzofuranone, B. P. 168–169° C. at 1 mm., $n_D^{25}$ 1.5590, which has the formula:

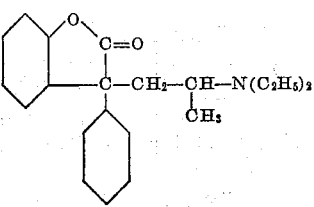

The mixture of the two racemic forms of the hydrochloride melts at 191–203° C.

Example 3A

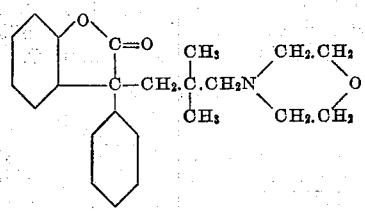

The sodium salt of 21.0 g. of 3-phenyl-2(3)-benzofuranone is prepared by its gradual addition to a suspension of 5 g. of 50% sodium hydride-paraffin in 200 cc. of dry benzene. After the addition of 20.0 g. of γ-morpholino-β,β-dimethylpropyl chloride the mixture is refluxed and stirred for 20 hours. Following the isolation procedure described in Example 1A, the 3-(γ-morpholino-β,β-dimethylpropyl)-3-phenyl-2(3)-benzofuranone is obtained as an oil, B. P. 219–220° C. at 2 mm., $n_D^{25}$ 1.5618. The yield is 73% when corrected for the recovery of some of the unreacted chloroalkylmorpholine. The free base solidifies and melts at 94.5–95.5° C. after crystallization from petroleum ether.

Example 3B

The hydrochloride which may be prepared by treatment of the base produced in Example 3A with ethereal hydrogen chloride is crystallized from isopropyl alcohol, and melts at 219–220.50° C.

Example 3C

In an analogous manner, except that the reaction mixture is maintained at 35° C. instead of refluxing, there are obtained:

(1) By employing β-morpholinoethyl chloride, the base 3-(β-morpholinoethyl)-3-phenyl-2(3)-benzofuranone, B. P. 225–227° C. at 4 mm. in 66% yield. The base solidifies and melts at 95.5–96.5° C. The hydrochloride melts at 211–212° C.

(2) By employing β-piperidinoethyl chloride, the base 3-(β-piperidinoethyl)-3-phenyl-2(3)-benzofuranone, M. P. 88–89° C. The hydrochloride melts at 214–215° C.

(3) By employing γ-morpholinopropyl chloride, the base 3-(γ-morpholinopropyl)-3-phenyl-2(3)-benzofuranone having a melting point of M. P., 83–84° C. The hydrochloride melts at 237–238° C.

Example 4A

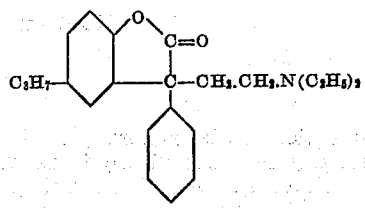

A mixture of the sodium salt produced by the method of Example 3A from 21.5 g. of 5-n-propyl-3-phenyl-2(3)-benzofuranone produced as in Example 16 and 12.0 g. of β-diethylaminoethyl chloride in 300 cc. of benzene is stirred at room temperature for 60 hours. The reaction product is worked up as previously mentioned in Example 1A. The 5-n-propyl-3-(β-diethylaminoethyl)-3-phenyl-2(3)-benzofuranone distills at 207–208° C. at 3 mm., $n_D^{24}$ 1.5480. The yield is 75% of the theoretical.

Example 4B

The hydrochloride obtained by treating the base produced in Example 4A with ethereal hydrogen chloride is crystallized from ethyl acetate and melts at 131–133°.

Example 4C

By a procedure similar to that in Example 4A, employing 5-methyl-3-phenyl-2(3)-benzofuranone as the compound to be alkylated, there is produced in 75% yield the base 5-methyl-3-(β-diethylaminoethyl)-3-phenyl-2(3)-benzofuranone, B. P. 196° C. at 4 mm., $n_D^{24}$ 1.5591. The hydrochloride obtained by treating this base with ethereal hydrogen chloride melts at 143–144.5° C.

Example 5A

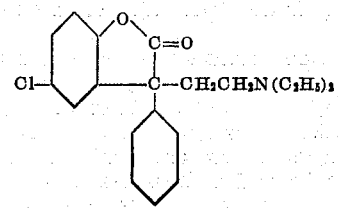

20.2 g. of 5-chloro-3-phenyl-2(3)-benzofuranone is converted to its sodium salt as in Example 1A and condensed in benzene with 11.5 g. of β-diethylaminoethyl chloride by stirring at room temperature for two hours and finally refluxing for three hours. The basic fraction isolated in the foregoing manner solidifies upon removal of the solvent. The yield of 5-chloro-3-(β-diethylaminoethyl)-3-phenyl-2(3)-benzofuranone melting at 94–95° C. after crystallization from cyclohexane, is 70%.

Example 5B

Following the procedure in Example 1B the above base is converted to the hydrochloride which can be crystallized from an absolute alcohol-ether mixture. It melts at 187–188° C.

Example 5C

In an analogous manner there is obtained by employing 5-bromo-3-phenyl-2(3)-benzofuranone, the base 5-bromo-3-(β-diethylaminoethyl)-3-phenyl-2(3)-benzofuranone, B. P. 205–206° at 4 mm., $n_D^{26}$ 1.5808. The yield is 71% of theory. The base solidifies in time and melts at 90–92° C. The hydrochloride of this material melts at 178–179° C.

Example 6A

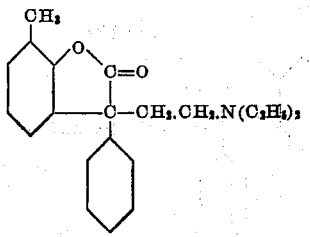

By stirring 4.3 g. of 7-methyl-3-phenyl-2(3)-benzofuranone in the form of its sodium salt with 2.6 g. of β-diethylaminoethyl chloride in a benzene medium at room temperature for 18 hours, the new base is obtained in a 69% yield. The 7-methyl-3-(β-diethylaminoethyl)-3-phenyl-2(3)-benzofuranone boils at 193–194° C. at 4 mm., $n_D^{24}$ 1.5577.

Example 6B

The hydrochloride of the above base melts at 171.5–173° C. after crystallization from acetone-ether.

Example 7A

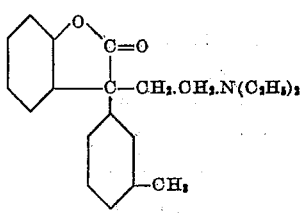

The condensation is carried out by stirring the sodium salt of the 3-(m-tolyl)-2(3)-benzofuranone with the β-diethylaminoethyl chloride at 25° C. for 18 hours. The 3-(β-diethylaminoethyl)-3-(m-tolyl)-2(3)-benzofuranone has B. P. 183–185° C. at 3 mm., $n_D^{25}$ 1.5585.

Example 7B

The hydrochloride of the above base can be crystallized from acetone-ether and melts at 147.5–149° C.

Example 8A

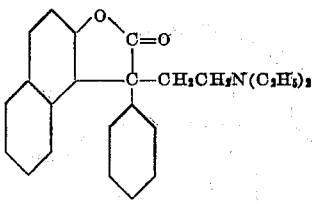

A benzene suspension of the sodium salt from 26.0 g. of 4,5-benzo-3-phenyl-2(3)-benzofuranone and 13.5 g. of β-diethylaminoethyl chloride is stirred at 25° C. for one hour, then refluxed and stirred 15 hours.

Upon following the usual isolation procedure, the hydrochloride of the 4,5-benzo-3-(β-diethylaminoethyl)-3-phenyl-2(3)-benzofuranone separates out during the acidic extraction in a 59% yield. By crystallizing from isopropyl alcohol a M. P. 184–185° C. is attained.

Example 8B

The free base which is liberated by treatment of the above salt with sodium carbonate solidifies and melts at 98.5–99.5° C. after crystallization from alcohol.

Example 9A

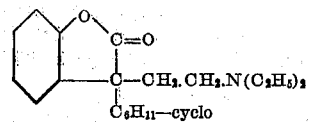

To a suspension of the sodium salt of 2-methoxybenzylcyanide, prepared by a three-hour refluxing of 42.5 g. of the nitrile with 12.1 g. of sodamide in 800 cc. of benzene, there is added 49.0 g. of cyclohexyl bromide. The mixture is refluxed and stirred for 20 hours. The reaction mixture is washed with water followed by concentration of the benzene solution. The residual oil distills at 155–157° C. at 3 mm. There is thus obtained 43 g. of α-cyclohexyl-2-methoxybenzyl cyanide, $n_D^{23}$ 1.5320, or 65% of the theoretical amount.

By refluxing 30 g. of α-cyclohexyl-2-methoxybenzyl cyanide with 5.9 of sodamide in 100 cc. of benzene for three hours, the sodium salt is formed. To the clear solution 20.3 g. of β-diethylaminoethyl chloride is added and the refluxing and stirring continued for 20 hours.

The benzene layer is washed with water several times. Extraction with acid is followed by addition of alkali to the acid solution, extraction of the liberated base with ether, and finally removal of the ether and distillation of the residual oil. There is thus obtained 32.0 g. of α-cyclohexyl-α-(β-diethylaminoethyl)-2-methoxybenzyl cyanide, B. P. 168–170° C. at 2 mm., $n_D^{25}$ 1.5182 or 75% of theoretical amount.

A solution of 30.0 g. of α-cyclohexyl-α-(β-diethylaminoethyl)-2-methoxybenzyl cyanide in 180 cc. of 48% hydrobromic acid is refluxed 45 hours. The solution is then concentrated to dryness on the steam bath and treated with excess thionyl chloride. After removing the excess of the reagent on the steam bath, ice water and ether are added and the mixture stirred until solution is complete. The aqueous portion is made alkaline and the base is extracted with ether, concentrated and distilled. The 3-cyclohexyl-3-(β-diethylaminoethyl)-2(3)-benzofuranone boils at 175–176° C. at 3 mm. $n_D^{25}$ 1.5284. The yield is 21.5 g. or 75% of theory.

Example 9B

The hydrochloride of the base produced in Example 9A may be prepared in the usual manner and can be crystallized from ethyl acetate, M. P. 142–144°.

Example 9C

In an analogous manner by employing 5-methyl-2-methoxybenzyl cyanide as the starting material, there is obtained:

(1) By direct alkylation with β-diethylaminoethyl chloride, an 83% yield of α-(β-diethylaminoethyl)-2-methoxy-5-methylbenzyl cyanide, B. P. 158–160° C. at 3 mm. Hydrolysis and ring closure gives the base 3-(β-diethylaminoethyl)-5-methyl-2(3)-benzofuranone B. P. 140–143° C. at 4 mm.

(2) By alkylation with n-propylbromide a 92% yield of the intermediate α-propyl-2-methoxy-5-methylbenzyl cyanide, B. P. 129°–130° C. at 3 mm. Subsequent treatment with β-diethylaminoethyl chloride gives 79% of the base α-(β-diethylaminoethyl)-α-propyl-2-methoxy-5-methylbenzyl cyanide, B. P. 162–164° C. at 2.5 mm. This base may also be obtained by direct alkylation of the α-(β-diethylaminoethyl)-2-methoxy-5-methyl benzyl cyanide mentioned in (1) with propyl bromide. Hydrolysis, followed by ring closure in the usual manner yields 85% of the base 3-(β-diethylaminoethyl)-5-methyl-3-propyl-2(3)-benzofuranone, B. P. 153° C. at 3 mm. $n_D^{24}$ 1.5088.

*Example 10*

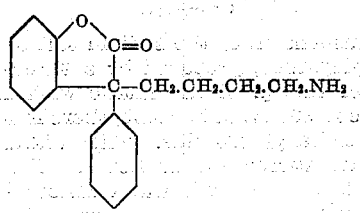

A benzene solution of the sodium salt of 50 g. of 3-phenyl-2(3)-benzofuranone and 36 g. of γ-bromobutyronitrile is refluxed and stirred for 24 hours. Washing with water is followed by concentration of the benzene solution. The residue of 45 g. crystallizes from alcohol giving 3-(γ-cyanopropyl)-3-phenyl-2(3)-benzofuranone, M. P. 98–99°.

The foregoing nitrile, 27.7 g., is dissolved in a solution of 12 g. of potassium hydroxide in 100 cc. of methyl alcohol and hydrogenated at 125° at 900 lbs. pressure with Raney nickel catalyst. The catalyst is removed by filtration and the filtrate evaporated to dryness. Ring closure is accomplished with thionyl chloride as in Example 9A. This is necessary because the alkaline reduction has opened the furanone ring, and it must be closed again. The residue after removal of the solvent and excess reagent is treated with a small amount of water. The solid material (27.8 g.) is filtered off and crystallized from an alcohol-ether mixture whereupon the hydrochloride of 3-(δ-aminobutyl)-3-phenyl-2(3)-benzofuranone, M. P. 108–110° C. is obtained.

*Example 11*

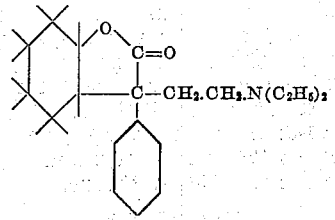

A mixture of 35 g. of benzyl cyanide and 10.1 g. of sodamide in 200 cc. of ether is refluxed and stirred four hours. Then 28 g. of β-diethylaminoethyl chloride is added and the refluxing and stirring is continued for 18 hours. The ether layer is washed with water, then extracted with dilute acid. Addition of alkali regenerates the base which is extracted with ether, concentrated and distilled. The resulting β-diethylaminoethylbenzyl cyanide boils at 133° C. at 3 mm. $n_D^{27.5}$ 1.5010. The yield is 32.5 g. or 74% of theory.

The sodium salt of 54.0 g. of the β-diethylaminoethylbenzyl cyanide is prepared in the foregoing manner from 10.5 g. of sodamide in ether solution. After the addition of 24.5 g. of cyclohexene oxide, the mixture is stirred and refluxed 48 hours. Hydrolysis and isolation of the basic fraction is carried out in the usual manner. The basic fraction is refluxed 30 hours with 300 cc. of 48% hydrobromic acid. After concentrating to dryness on the steam bath, the residual oil is treated with excess thionyl chloride. This reaction product is stirred with water and ether. The water layer is then separated, made alkaline and the resulting oil is extracted with ether which is then concentrated and the residue distilled. There is thus obtained 33.4 g. of pure 3-(β-diethylaminoethyl)-3-phenyl-2(3)-hexahydrobenzofuranone, B. P. 199–200° C. at 4 mm., $n_D^{24}$ 1.5291.

*Example 12A*

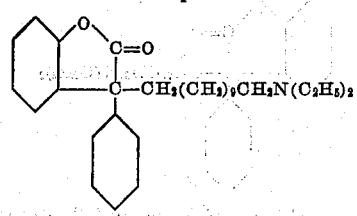

A benzene solution of the sodium salt from 19 g. of 3-phenyl-2(3)-benzofuranone and 22 g. of ω-diethylaminoundecyl chloride is refluxed for twenty hours. After washing with water, the benzene layer is concentrated and the residual oil distilled. There is obtained 3-ω-(diethylaminoundecyl)-3-phenyl-2(3)-benzofuranone, B. P. 205–210° at 0.1 mm., $n_D^{26}$ 1.5224.

*Example 12B*

The hydrochloride salt prepared in the manner described above for obtaining other salts is obtained as an oil which shows little tendency to crystallize.

*Example 13*

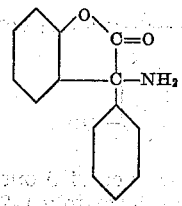

A mixture of 10 g. of α-phenyl-α-(-o-hydroxyphenyl)-α-aminoacetic acid hydrochloride and 6 g. of thionyl chloride is heated on the steam bath for four hours. The solution is concentrated under reduced pressure and the gummy residue stirred with acetone. The resulting solid is filtered and washed with acetone. The product 3-amino-3-phenyl-2(3)-benzofuranone hydrochloride decomposes around 218–220° but the range is somewhat dependent on the rate of heating.

*Example 14*

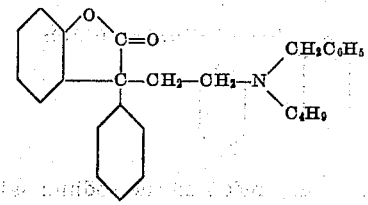

The condensation of the sodium salt from 72 g. of 3-phenyl-2(3)-benzofuranone and 76.8 g. of β-(N-benzyl-N-n-butylamino)ethyl chloride is carried out by refluxing the benzene solution of the reactants for thirty hours. After washing with water, the benzene layer is concentrated and the residual oil distilled. The 3-[β(N-benzyl N-n-butylamino)ethyl]-3-phenyl-2(3)-benzofuranone has B. P. 225–227° C. at 1 mm., $n_D^{22}$, 1.5750 and is obtained in a 62.5% yield.

*Example 15A*

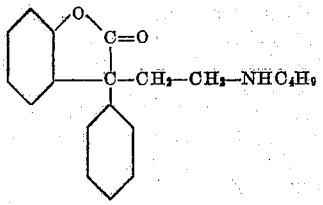

24 g. of the 3-[β(N-benzyl N-n-butylamino)ethyl]-3-phenyl-2(3)-benzofuranone obtained as described in Example 14, is dissolved in 50 cc. of glacial acetic acid. To the solution, a suitable catalyst, such as 0.24 g. of platinum oxide is added and the mixture hydrogenated at 45 lbs. pressure at 70° C. After five hours, the theoretical amount of hydrogen is absorbed. The catalyst is removed by filtration and the filtrate allowed to stand. The crystalline base 3-(β-n-butylaminoethyl)-3-phenyl-2(3)-benzofuranone which separates melts at 103–104° C.

*Example 15B*

By heating the base produced in Example 15A with concentrated hydrobromic acid, the hydrobromide salt separates as an oil which crystallizes upon stirring with ether. After crystallization from an acetone-ether solvent mixture the 3-(β-n-butylaminoethyl)-3-phenyl-2(3)-benzofuranone hydrobromide melts at 158–159° C.

*Example 16 (Intermediate)*

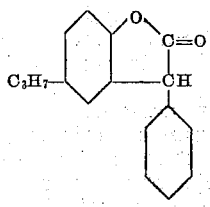

A mixture of 68 g. of p-n-propylphenol and 38 g. of mandelic acid is heated in a bomb at 230° for forty-five minutes. The resulting oil is poured into aqueous 10% sodium carbonate solution and stirred well. The oily layer is separated and the excess p-n-propylphenol removed at 80° at 3 mm. The residue solidifies and is crystallized from alcohol. The 3-phenyl-5-n-propyl-2(3)-benzofuranone melts at 56–57° C. This new compound is the starting material for Example 4A.

*Example 17 (Intermediate)*

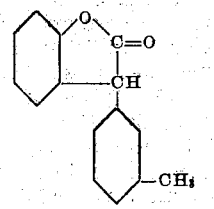

A mixture of 10 g. of m-methylmandelic acid, 10 g. of phenol and 30 cc. of 73% sulfuric acid is heated over a free flame until the mixture begins to darken. The careful addition of 300 cc. of water causes the separation of a tarry product which becomes crystalline upon stirring with 10% aqueous sodium carbonate. After crystallizing from dilute alcohol, the 3-(m-tolyl)-2(3)-benzofuranone melts at 88° C. This new compound is the starting material for Example 7A.

These compounds may be represented by the formula:

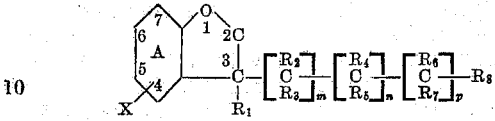

where $R_1$ is hydrogen, hydrocarbon, preferably alkyl, cycloalkyl, aryl or substituted aryl or alkyl; $R_3$, $R_2$, $R_4$, $R_5$, $R_6$, and $R_7$ may each be hydrogen, hydroxy, halogen, or hydrocarbon. $m$, $n$ and $p$ are each zero or a small whole number, but not all zero; X is one or more substituents selected from the group comprising hydrogen, hydrocarbon, substituted hydrocarbon, or halogen, or a chain of atoms joined at its ends to two adjacent carbon atoms of the ring A; and $R_8$ is a group containing a nitrogen atom. Compounds in which $R_8$ is an amino or quaternary ammonium group, are preferred for therapeutic purposes. Compounds in which $R_8$ is a nitrogen-containing group such as nitro, cyano, hydroxylamino, and acylamino are useful as intermediates in the synthesis of the preferred compounds. The ring A may be aromatic, or may have one or more of the double bonds reduced. The nitrogen-containing substituent bonded to the furanone ring may also be a heterocyclic ring.

In general, the compounds of this invention may be prepared by one of two methods. First, those in which $R_1$ is an aromatic ring may be prepared by treating the appropriate 3-$R_1$-2-(3) benzofuranone with one chemical equivalent of an alkali metal (or of an alkali metal compound equivalent to the metal in its reaction on the reagents involved, such as the amide, alcoholate or hydride) in a suitable solvent, such as alcohol, toluene or benzene, to form the alkali metal derivative of the 3-aryl-2-(3) benzofuranone. To this is then added the desired aminoalkyl halide or suitable derivative or precursor and the mixture stirred for several hours. The hydrohalide addition compound of the amine may be used instead if an additional equivalent amount of alkali metal compound is present to liberate the base from the hydrohalide salt. If the resulting 3-substituted-3-aryl-2-(3) benzofuranone contains a basic amino group it is extracted by treating the mixture with a dilute aqueous solution of an acid such as hydrochloric acid. The acid solution is then made alkaline by means of an alkali carbonate such as sodium carbonate and the liberated organic base extracted with a suitable organic solvent, such as, ether or benzene. If, on the other hand, the 3-substituted-3-aryl-2(3)-benzofuranone does not contain a basic group, the reaction product is washed with water and the non-aqueous layer separated. The solvent in either case is removed by distillation and the residue may be purified by suitable treatment, such as, fractional distillation under reduced pressure or crystallization. Addition salts of the product may be formed by passing gaseous hydrogen halides into ethereal solutions of the bases. The addition salts may precipitate as gummy solids and may be purified by crystallization from a suitable solvent such as for example a mixture of acetone and ether.

When $R_1$ in the above formula is hydrogen, alkyl, or cycloalkyl a solution of the appropriate 2 alkoxy benzyl cyanide in benzene, toluene or other suitable solvent is refluxed with an alkali metal or compound such as sodium, metal, or amide or hydride to produce a suspension of the alkali metal derivative of the alkoxy benzyl cyanide. To this suspension is then added the appropriate alkyl or cycloalkyl halide for introduction of the group $R_1$ into the molecule and refluxing is continued. When the reaction is complete the mixture is washed with water, the non-aqueous layer separated and dried, and the solvent removed by distillation. The resulting crude cyanide may be purified by fractional distillation. This cyanide is then refluxed in a suitable solvent such as benzene or toluene with an alkali metal or compound, to produce the alkali metal derivative of the cyanide to which is then added the appropriate amino alkyl halide (or derivative or precursor) and refluxing is continued until completion of the reaction. The mixture is then washed with water several times and the non-aqueous layer separated. If the resulting product contains a basic group this layer is extracted with acidulated water, this water layer is separated, made alkaline, and extracted with a suitable solvent. The solvent is removed by distillation and the crude cyanide may be purified by fractional distillation or crystallization. This substituted cyanide is then refluxed with 48% hydrobromic acid for several hours and then concentrated to dryness. The residue is then treated with an excess of thionyl chloride, if required to complete the ring closure. Thionyl chloride, if used, is subsequently removed by distillation. Ice water and a suitable solvent are added to the residue and stirring continued until solution is complete. The aqueous portion of the mixture is made alkaline and then extracted several times with a suitable solvent. The non-aqueous layers are combined, the solvent removed by distillation and the resulting substituted benzofuranone purified by fractional distillation or crystallization.

It will be obvious that the well-known modifications of an aryl group include the attaching of additional hydrogen atoms or other groups under conditions such that one or more of the double bonds in the ring is removed; and that an aryl group or modified aryl group may be a substituent on an alkyl chain. The phrase, "substituted alkyl" and "substituted aryl" are intended to include all such obvious combinations.

Pharmacology

These compounds have been tested as antispasmodic agents and have been found to be exceedingly efficacious in relieving smooth muscle spasms of both nervous and muscular origin. Moreover, these compounds are surprisingly free of some of the clinical disadvantages associated with atropine and papaverine and they exhibit fewer side reactions than some of the known antispasmodic agents.

Other types of antispasmodics exhibit some undesirable side reactions from which the benzofuranones of this invention appear to be relatively free. For example, therapeutic doses of atropine may dilate the pupil of the eye and cause a large decrease in salivary secretion but these benzofuranones produce very little if any such effect.

In addition to being useful in the treatment of spastic conditions of the gastrointestinal, bronchial and urogenital tracts, these substances are effective in combating the effect of histamine, and in relieving asthma, colic, dysmenorrhea, and other conditions characterized by smooth muscle contractions, whether they be of musculotropic or neurotropic origin.

Some of these compounds, particularly that of Example 1A, exert a powerful and prolonged local anesthetic effect with relatively little local irritation, as compared with other known synthetic antispasmodics. To secure such local action it is only necessary to administer the therapeutic in such a way that it will be present in effective concentration in the localized area where the anesthetic effect is desired. This local anesthetic effect may in certain conditions be made to contribute greatly to alleviation of pain, and thus becomes synergistic with the more generalized spasmolytic action which results from the same administration.

The new products may be administered orally, intramuscularly, subcutaneously or intravenously and are equally effective whether employed in powdered form or admixed with an inert solid diluent or dissolved in a suitable liquid vehicle. They are exceedingly stable in aqueous solution and can be stored in that condition for long periods without deterioration. This is in marked contrast to many other synthetic antispasmodics.

In addition to having important physiological properties, these compounds are relatively non-toxic and have a high therapeutic index. In tests conducted on the specific compound of Example 1A, the average clinical dose has been 50 to 150 mg. administered either by mouth or by parenteral injection. In some cases this has been continued over several weeks without cumulative toxic effect.

This compound has also been given to patients over several months with success and without producing any symptoms of chronic toxicity. The drug appears to be entirely non-narcotic and prolonged administration produces no significant increase in tolerance. In other words, the response to a given dosage remains substantially unimpaired.

As previously mentioned, all of these derivatives of benzofuranone are usually more soluble in water as salts than as the free bases and are therefore administered water soluble as salts when rapid effect is desired. Any acid which produces a water-soluble salt and does not appreciably enhance the toxicity is suitable for use. Such acids as sulphuric, phosphoric, hydrochloric, levulinic, mucic, acetic and tartaric acid are among those which are satisfactory. The salts produced by combination of these benzofuranones with certain other non-toxic acids are very sparingly soluble in water. These sparingly soluble compounds, as well as the free bases, may be administered when the pharmacological effect desired should be slow in onset and relatively long in duration. Where any benzofuranone is mentioned in the following claims, it is intended to include both the free base and the salts. It will be obvious that such addition compounds as the quaternary ammonium salts, of which the methobromide of Example 1C is an illustration may be derived from any of the other examples of benzofuranones and by use of other alkyl halides. These quaternary ammonium salts have been shown to have a more powerful action than the tertiary amines from which they have been produced.

Without further elaboration, the foregoing will so fully explain our invention that others may readily adapt the same for use under varying conditions of service. It will, for instance, be obvious that whereas the best results obtained hitherto in preparing compounds in which $R_1$ is aromatic, can be according to the procedure described in column 10, starting with the furanone ring already formed, whereas the other compounds have been prepared by the process in columns 10 and 11 in which closure of the furanone ring is the last step, it may under certain conditions be advantageous to form aryl substituted compounds by final ring closure or alkyl substituted compounds by addition to a previously formed furanone ring. Also, when $R_1$ is a heterocyclic ring, the procedures outlined are equally applicable.

We claim:

1. A 2(3)-benzofuranone characterized by a

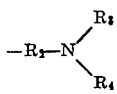

substituent at the 3-position, in which $R_2$ represents an alkylene group containing 2 to 11 carbon atoms inclusive, and $R_3$ and $R_4$ are selected from the class consisting of hydrogen and alkyl groups containing 1 to 4 carbon atoms inclusive and alkyl groups forming a cyclic group, and salts thereof.

2. A 2(3)-benzofuranone in accordance with claim 1 being further characterized by a $R_1$ substituent at the 3-position, in which $R_1$ is selected from the class consisting of alkyl, cycloalkyl and aryl groups, and salts thereof.

3. A 3-(dialkylaminoalkyl)-3-phenyl-2(3)-benzofuranone and salts thereof, said dialkyl group being made up of alkyl groups containing 1 to 4 carbon atoms and said alkyl group being an alkylene group containing 2 to 11 carbon atoms.

4. In the method of making a 2(3)-benzofuranone in accordance with claim 1, the improvement which comprises reacting the alkali metal salt of the benzofuranone with a compound represented by the formula

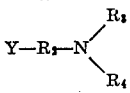

where $R_2$, $R_3$ and $R_4$ represent the substituents set forth in claim 1 and Y represents a halogen atom.

5. In the method of making a 2(3)-benzofuranone in accordance with claim 1, the improvement which comprises reacting the alkali metal salt of a 2-alkoxybenzyl cyanide with a compound represented by the formula

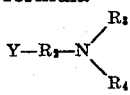

where $R_2$, $R_3$ and $R_4$ represent the substituents set forth in claim 1, and Y represents a halogen atom, hydrolyzing the resulting reaction product to convert the alkoxy group to a hydroxy group and the cyanide group to a carboxyl group, and then condensing the resulting hydroxy and carboxyl groups in the presence of an acid condensing agent to close and form the furanone ring.

6. The compound 3-$\beta$-diethylaminoethyl-3-phenyl-2-(3) benzofuranone represented by the formula:

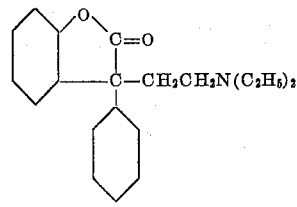

7. The compound 3-$\beta$-diethylaminoethyl-3-cyclohexyl-2-(3)-benzofuranone represented by the formula:

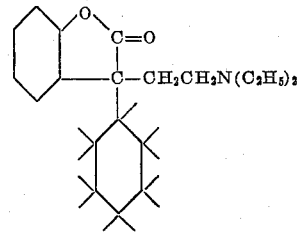

8. The compound 3-$\beta$-diethylaminoethyl-3-phenyl-2-(3)-benzofuranone methobromide represented by the formula:

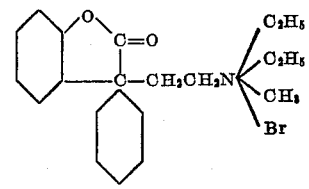

9. A 3-(diakylaminoalkyl-3-cyclohexyl-2(3)-benzofuranone and salts thereof, said dialkyl group being made up of alkyl groups containing 1 to 4 carbon atoms and said alkyl group being an alkylene group containing 2 to 11 carbon atoms.

10. The compound 3-($\beta$-dimethylaminoethyl)-3-phenyl-2(3)-benzofuranone.

11. The compound 3-($\gamma$-diethylaminopropyl)-3-phenyl-2(3)-benzofuranone.

ARTHUR W. WESTON.
MARVIN A. SPIELMAN.

REFERENCES CITED

The following references are of record in the file of this patent:

UNITED STATES PATENTS

| Number | Name | Date |
| --- | --- | --- |
| Re. 22,264 | Loewe | Feb. 9, 1943 |
| 2,305,529 | Hester | Dec. 15, 1942 |
| 2,342,135 | Gibbs | Feb. 22, 1944 |
| 2,380,063 | Mowry | July 10, 1945 |

OTHER REFERENCES

Chemical Abstract, vol. 33, page 10351.